(12) United States Patent
Fan et al.

(10) Patent No.: US 8,307,033 B2
(45) Date of Patent: Nov. 6, 2012

(54) ELECTRONIC DEVICE FOR THE INSERTION OF A PORTION OF A FIRST IMAGE TO A PORTION OF A SECOND IMAGE AND DATA TRANSMISSION METHOD THEREOF

(75) Inventors: Chen-Huang Fan, Taipei Hsien (TW); Shu-Chuan Hung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 146 days.

(21) Appl. No.: 12/871,837

(22) Filed: Aug. 30, 2010

(65) Prior Publication Data

US 2011/0137990 A1   Jun. 9, 2011

(30) Foreign Application Priority Data

Dec. 9, 2009   (CN) .......................... 2009 1 0311128

(51) Int. Cl.
*G06F 15/16* (2006.01)
*G06F 17/24* (2006.01)
(52) U.S. Cl. .................. 709/204; 709/248; 715/255
(58) Field of Classification Search .................. None
See application file for complete search history.

(56) References Cited

U.S. PATENT DOCUMENTS

2004/0165788 A1*  8/2004  Perez et al. .................. 382/284
2009/0226101 A1*  9/2009  Lessing ........................ 382/229

OTHER PUBLICATIONS

Pierce and Nichols. "An Infrastructure for Extending Applications' User Experience Across Multiple Devices." UIST '08. Oct. 19-22.*

* cited by examiner

*Primary Examiner* — Scott Christensen
(74) *Attorney, Agent, or Firm* — Altis Law Group, Inc.

(57) ABSTRACT

A data transmission method for transmitting data from a first computer to a second computer includes: obtaining a first image of visual information displayed on the first computer and displaying the first image; determining whether a to-be-copied portion from the first image is selected; storing the selected to-be-copied portion from the first image; obtaining a second image of visual information displayed on the second computer and displaying the second image; determining whether a to-be-updated portion from the second image is selected; and transmitting the selected-to-be-copied portion from the first image and the to-be-updated portion from the second image to the second computer. A related electronic device is also provided.

18 Claims, 3 Drawing Sheets

ELECTRONIC DEVICE FOR THE INSERTION OF A PORTION OF A FIRST IMAGE TO A PORTION OF A SECOND IMAGE AND DATA TRANSMISSION METHOD THEREOF

BACKGROUND

1. Technical Field

The present disclosure relates to electronic devices and, particularly, to an electronic device for transmitting data from a first computer to a second computer and a data transmission method thereof.

2. Description of Related Art

Conventionally, data can be transmitted between computers through a cable connecting the two computers or over a network. If such a cable or a network is not available, a portable storage medium such as a USB flash memory device can be used. The portable storage medium is firstly connected to a first computer to obtain desired data, and is then connected to a second computer to transmit the desired data to the second computer. If more computers need the desired data or the two computers are at locations far away from each other, using the portable storage medium is not timely or convenient.

BRIEF DESCRIPTION OF THE DRAWINGS

The components of the drawings are not necessarily drawn to scale, the emphasis instead being placed upon clearly illustrating the principles of an electronic device and a data transmission method. Moreover, in the drawings, like reference numerals designate corresponding parts throughout several views.

DETAILED DESCRIPTION

Figure 1:
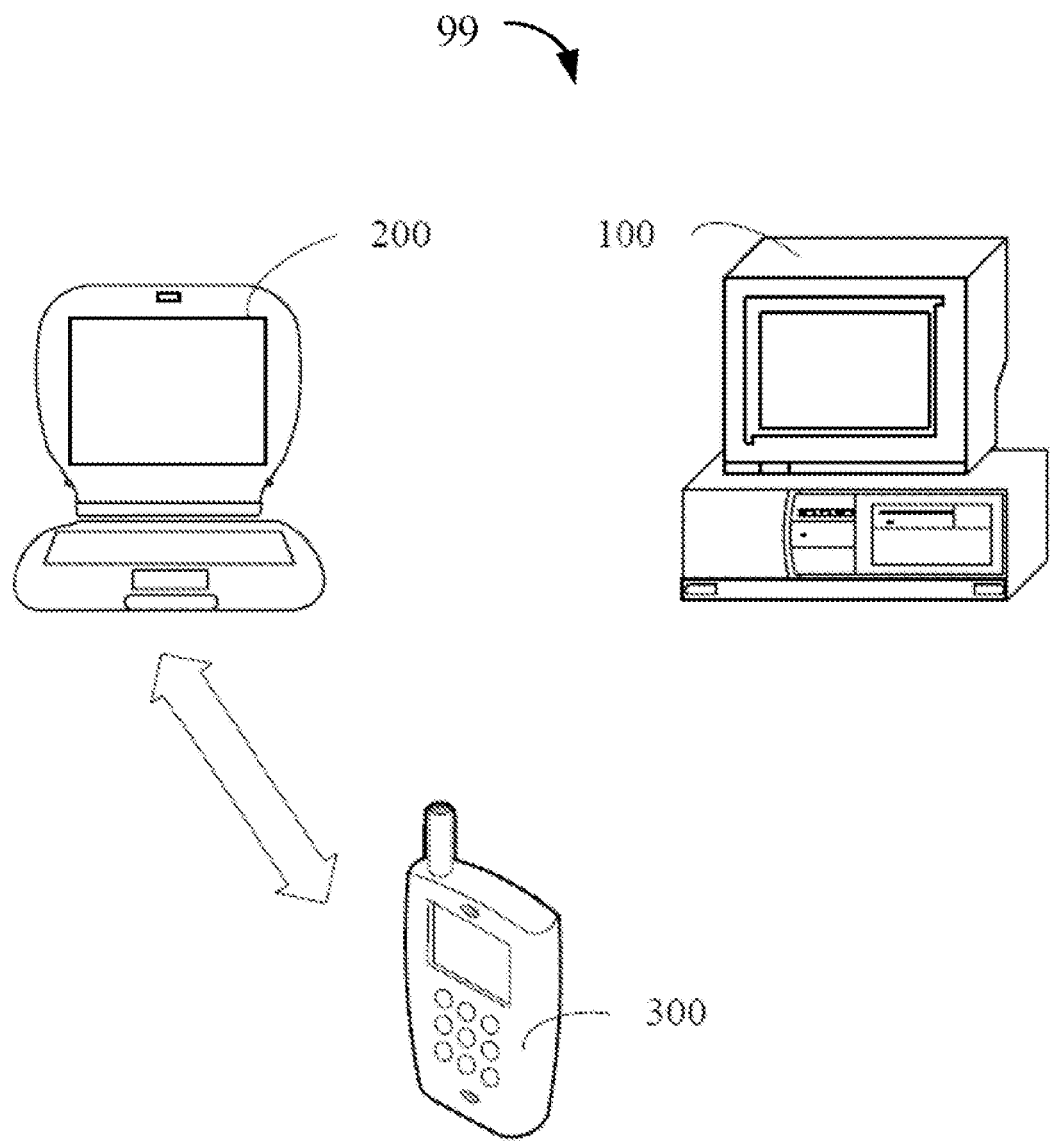
FIG. 1 is a schematic view of a data transmission system in accordance with an exemplary embodiment.

Referring to FIG. 1, a data transmission system 99 includes a first computer 100, a second computer 200, and an electronic device 300. The electronic device 300 may communicate with the first computer 100 and the second computer 200. The electronic device 300 may be a mobile phone, a PDA, or the like.

Figure 2:
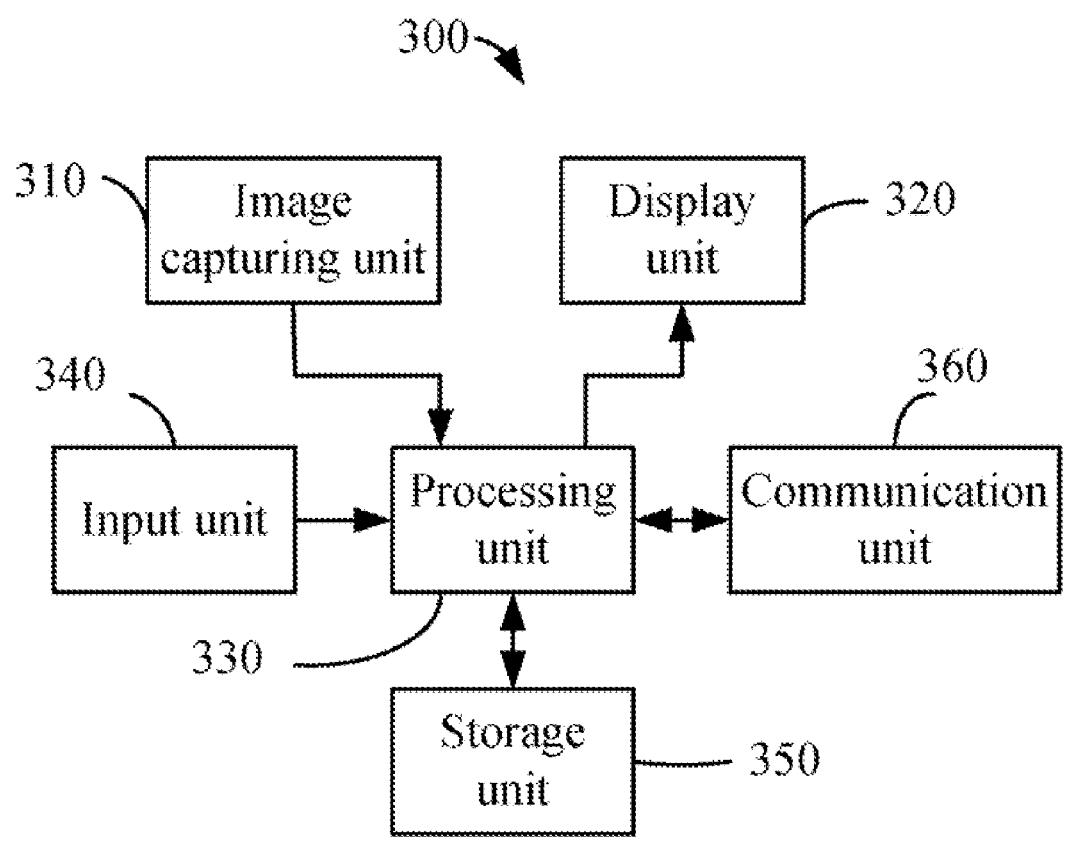
FIG. 2 is a block diagram of an electronic device of FIG. 1 in accordance with an exemplary embodiment.

Referring to FIG. 2, the electronic device 300 includes an image capturing unit 310, a display unit 320, a processing unit 330, an input unit 340, a storage unit 350, and a communication unit 360. The communication unit 360 can include, for example, a universal serial bus (USB) unit, a BLUETOOTH unit, an infrared unit, or a WIFI unit.

The image capturing unit 310 can be used to capture a first image of visual information displayed on the first computer 100, and capture a second mage of visual information displayed on the second computer 200. The image capturing unit 310 may be a camera mounted in the electronic device 300. The first image and the second image are stored in the storage unit 350. In an alternative embodiment, the electronic device 300 does not employ the image capturing unit 310 to obtain the first image and/or the second image, and the electronic device 300 may obtain the first image from the first computer 100 and/or the second image from the second computer 200 through the communication unit 360.

The processing unit 330 is configured to control the display unit 320 to display the first image and the second image.

The input unit 340 is configured to allow a user to select a to-be-copied portion from the first image and a to-be-updated portion from the second image. The to-be-updated portion may be an inserted area where the selected to-be-copied portion will be inserted in, or may be a to-be-replaced portion which will be replaced by the selected to-be-copied portion. The input unit 340 may be a keypad or a touch pad for example.

The processing unit 330 is further configured to store the selected to-be-copied portion from the first image in the storage unit 350, and transmit the selected to-be-updated portion and the selected to-be-copied portion to the second computer 200 through the communication unit 360 once the to-be-updated portion is selected.

The second computer 200 then can insert the selected to-be-copied portion into the visual information displayed on the second computer 200 at an area corresponding to the selected insertion area, or replace a portion of the visual information corresponding to the selected to-be-replaced portion with the selected to-be-copied portion. Therefore, even if a communication network is not available between the first computer 100 and the second computer 200, data can be conveniently transmitted between the first computer 100 and the second computer 200 through the electronic device 300.

Figure 3:
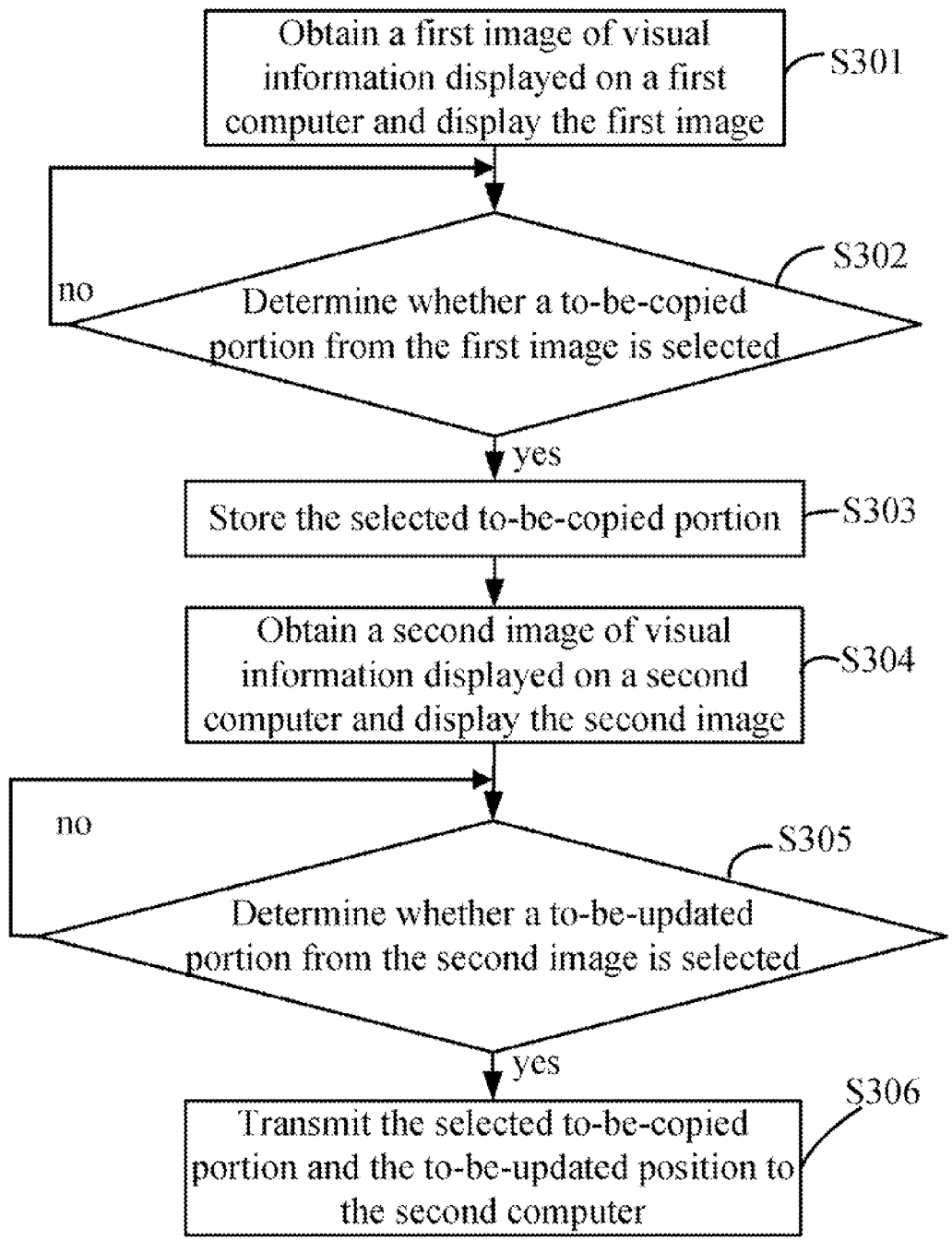
FIG. 3 is a flowchart of a data transmission method in accordance with an exemplary embodiment.

Referring to FIG. 3, a flowchart of a data transmission method in accordance with an exemplary embodiment is illustrated.

In step S301, the processing unit 330 obtains a first image of visual information displayed on the first computer 100 and displays the first image on the display unit 320. In this embodiment, the first image is captured by the image capturing unit 310 and stored in the storage unit 350, and the processing unit 330 obtains the first image from the storage unit 350. In an alternative embodiment, the processing unit 330 obtains the first image from the first computer 100 through the communication unit 360.

In step S302, the processing unit 330 determines whether a to-be-copied portion from the first image is selected through the input unit 340. If yes, the procedure goes to step S303, otherwise the procedure repeats step S302.

In step S303, the processing unit 330 stores the selected to-be-copied portion in the storage unit 350.

In step S304, the processing unit 330 obtains a second image of visual information displayed on the second computer unit 200 and displays the second image on the display unit 320. In this embodiment, the second image is captured by the image capturing unit 310 and stored in the storage unit 350, and the processing unit 330 obtains the second image from the storage unit 350. In an alternative embodiment, the processing unit 330 obtains the second image from the second computer 200 through the communication unit 360.

In step S305, the processing unit 330 determines whether a to-be-updated portion is selected from the second image. If yes, the procedure goes to step S306, otherwise, the procedure repeats step S305. The to-be-updated portion may be an inserted area where the selected to-be-copied portion will be inserted in, or may be a to-be-replaced portion which will be replaced by the selected to-be-copied portion.

In step S306, the processing unit 330 transmits the selected to-be-copied portion and the selected to-be-updated portion to the second computer 200. Therefore, The second computer 200 can insert the selected to-be-copied portion into the visual information displayed on the second computer 200 at an area corresponding to the selected inserted area, or replace a portion of the visual information corresponding to the selected to-be-replaced portion with the selected to-be-copied portion.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device capable of transmitting data between a first computer and a second computer, the electronic device comprising:
    a display unit;
    a storage unit;
    a communication unit;
    a processing unit configured to:
        obtain a first image of visual information displayed on the first computer,
        obtain a second image of visual information displayed on the second computer, and
        display the first image and the second image on the display unit; and
    an input unit configured to allow a user to select a to-be-copied portion from the first image and a to-be-updated portion from the second;
    the processing unit further configured to:
        store the selected to-be-copied portion from the first image in the storage unit, and
        transmit the selected to-be-copied portion from the first image and the selected to-be-updated portion from the second image to the second computer through the communication unit once the to-be-updated portion is selected,
            wherein the second computer updates the selected to-be-updated portion of the second image displayed on the second computer with the selected to-be-copied portion received from the processing unit.

2. The electronic device as described in claim 1, wherein the selected to-be-updated portion from the second image is an insertion area where the selected to-be-copied portion from the first image will be inserted in.

3. The electronic device as described in claim 1, wherein the selected to-be-updated portion from the second image is a to-be-replaced portion which will be replaced by the selected to-be-copied portion from the first image.

4. The electronic device as described in claim 1, further comprising an image capturing unit configured to capture the first image and store the first image in the storage unit, and the processing unit is configured to obtain the first image from the storage unit.

5. The electronic device as described in claim 1, further comprising an image capturing unit configured to capture the second image and store the second image in the storage unit, and the processing unit is configured to obtain the second image from the storage unit.

6. The electronic device as described in claim 1, further comprising an image capturing unit configured to capture the first image and the second image, and store the first image and the second image in the storage unit, and the processing unit is configured to obtain the first image and the second image from the storage unit.

7. The electronic device as described in claim 1, wherein the processing unit is configured to obtain the first image from the first computer through the communication unit.

8. The electronic device as described in claim 1, wherein the processing unit is configured to obtain the second image from the second computer through the communication unit.

9. The electronic device as described in claim 1, wherein the processing unit is configured to obtain the first image and the second image from the second computer through the communication unit.

10. A data transmission method for transmitting data between a first computer and a second computer comprising:
    obtaining, by an electronic device, a first image of visual information displayed on the first computer and displaying the first image on the electronic device;
    receiving, by the electronic device, a first selection of a to-be-copied portion of the first image from a user;
    storing, by the electronic device, the selected to-be-copied portion from the first image;
    obtaining, by the electronic device, a second image of visual information displayed on the second computer and displaying the second image on the electronic device;
    receiving, by the electronic device, a second selection of a to-be-updated portion of the second image from the user; and
    transmitting the selected-to-be-copied portion from the first image and the to-be-updated portion from the second image to the second computer,
        wherein the second computer updates the selected to-be-updated portion of the second image displayed on the second computer with the selected to-be-copied portion received from the processing unit.

11. The method as described in claim 10, wherein the selected to-be-updated portion from the second image is an insertion area where the selected to-be-copied portion from the first image will be inserted in.

12. The method as described in claim 10, wherein the selected to-be-updated portion from the second image is a to-be-replaced portion which will be replaced by the selected to-be-copied portion from the first image.

13. The method as described in claim 10, wherein the first image is captured by an image capturing unit.

14. The method as described in claim 10, wherein the second image is captured by an image capturing unit.

15. The method as described in claim 10, wherein the first image and the second image are captured by an image capturing unit.

16. The method as described in claim 10, wherein the first image is obtained from the first computer.

17. The method as described in claim 10, wherein the second image is obtained from the second computer.

18. The method as described in claim 10, wherein the first image is obtained from the first computer, and the second image is obtained from the second computer.

* * * * *